(12) United States Patent
Bhide et al.

(10) Patent No.: US 7,950,008 B2
(45) Date of Patent: May 24, 2011

(54) SOFTWARE INSTALLATION IN MULTIPLE OPERATING SYSTEMS

(75) Inventors: Manish Anand Bhide, New Delhi (IN); Atul Laxmikant Kalantri, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1242 days.

(21) Appl. No.: 11/175,742

(22) Filed: Jul. 6, 2005

(65) Prior Publication Data

US 2007/0011672 A1    Jan. 11, 2007

(51) Int. Cl.
*G06F 9/445* (2006.01)

(52) U.S. Cl. ......... 717/174; 717/175; 717/176; 717/178

(58) Field of Classification Search .................. 717/174, 717/175, 176, 178
See application file for complete search history.

(56) References Cited

U.S. PATENT DOCUMENTS

| | | | |
|---|---|---|---|
| 5,860,012 A * | 1/1999 | Luu ............................... | 717/175 |
| 6,161,218 A * | 12/2000 | Taylor ........................... | 717/174 |
| 6,332,219 B1 | 12/2001 | Curtis et al. | |
| 6,425,126 B1 | 7/2002 | Branson et al. | |
| 6,963,981 B1 * | 11/2005 | Bailey et al. ..................... | 726/22 |
| 7,451,196 B1 * | 11/2008 | de Vries et al. ............... | 709/220 |
| 2002/0095672 A1 | 7/2002 | Evans et al. | |

OTHER PUBLICATIONS

Montante, R. "Beowulf and Linux—An Integrated Project Course", 2002, CCSC, p. 10-18.*

* cited by examiner

*Primary Examiner* — Wei Y Zhen
*Assistant Examiner* — Qamrun Nahar
(74) *Attorney, Agent, or Firm* — Gibb I.P. Law Firm, LLC; Derek S. Jennings

(57) ABSTRACT

A software application can be installed under one operating system, and accessed for execution by a second operating system compatible with the first operating system by identifying and making appropriate changes to system parameters in the second operating system. The two operating systems may be installed on the same of different machines. A record can be made of changes in system parameters that are made upon installation of the software application in the first operating system as a basis for making appropriate changes in the system parameters of the second operating system to allow the software application to be accessed for execution from the second operating system.

20 Claims, 2 Drawing Sheets

SOFTWARE INSTALLATION IN MULTIPLE OPERATING SYSTEMS

FIELD OF THE INVENTION

The present invention relates to software use, and relates more particularly to sharing a single instance of a software installation in a multibooting environment, or between multiple machines on a network.

BACKGROUND

Software users are familiar with the existing problem that software applications installed on one machine in a network are not sharable between other machines in the network. As an example, consider Machine M1 and Machine M2, which belong to the same network. Machine M1 uses a first operating system, OS#1 (for example, Microsoft's Windows 2000 operating system), and Machine M2 uses a second operating system, OS#2 (for example, Microsoft's Windows 2003 Server operating system).

A user installs a software application, for example, Microsoft Word, on Machine M1. The software application operates as expected when used from Machine M1. The user is, however, unable to use the same software application on Machine M2, which is typical in many small networks in which users share machines. She or he has no other option but to make a fresh installation of the desired software application on Machine M2. This can be an understandable source of frustration.

Similar considerations apply to machines that operate a multibooting environment; that is, have multiple operating systems or multiple versions of an operating system installed. This is often the case for software developers that use multiple software operating systems for software development and testing purposes. Software applications installed in one operating system cannot be used in other operating systems installed on that machine. Instead, the software application is installed under each operating system in turn. This limitation is burdensome, and an unwarranted drain on productivity.

A need clearly exists, in view of the above observations, for an improved manner of deploying software applications.

SUMMARY

A software application can be installed in one operating system environment, and used from another compatible operating system environment by making appropriate changes to system parameters in the compatible operating system environment.

The two operating systems may be installed on the same of different machines. A record can be made of changes in system parameters that are made upon installation of the software application in the first operating system as a basis for making appropriate changes in the system parameters of the second operating system to allow the software application to be accessed for execution from the second operating system.

As an example, a software application can be installed on one machine (Machine M1) and used from a remote machine (Machine M2), without requiring a conventional installation on machine M2. Appropriate changes are made to the appropriate system variables (such as Windows registry values on machine M2, if the machines M1 and M2 use Windows operating systems), or configuration files (if the Machines M1 and M2 do not use Windows operating system). (All such registry values, system variables, and so on, are generically referred to as system parameters.) Also, one appropriately maps the network drive of machine M1 on M2.

Alternatively, a software application can be installed on an operating system (OS#1) of a particular machine, and used on another operating system (OS#2) present on the same machine, without requiring a conventional installation on the other operating system (OS#2) on that machine.

Changes in system parameters that are required to allow operation of the software application in the other operating system are identified. This may be done by determining differences in system parameters in a first operating system, prior and subsequent to installation of the software application.

DETAILED DESCRIPTION

The example described herein is illustrated with reference to different "Windows" operating systems produced by Microsoft Corporation. A user can install a software application on any one of the operating systems in a "Windows multiboot environment" and use the software application from any of the other installed operating systems on the machine.

A software application (such as Microsoft Word) is installed on any one of the operating systems installed on the machine. Assume that two Windows operating systems, (OS#1 and OS#2 hereafter) are installed on the same machine. Software applications installed under OS#1 are unable to be used from OS#2, and vice versa. This is because the changes made to accommodate the software application in OS#1 are not available or accessible from the other operating system, namely OS#2. Other applicable changes may include changes to configuration files such as .ini files, .dat files, and so on.

These changes include, for example, changes to values recorded in the Windows registry, and changes to system wide variables such as the PATH Variable, SYSTEM variable, and so on.

For the software application installed on OS#1 to be usable or seamlessly accessible from OS#2, the changes implemented to accommodate the software application (as described above) either need to be available, or be replicated, or otherwise implemented under OS#O2.

Figure 1:
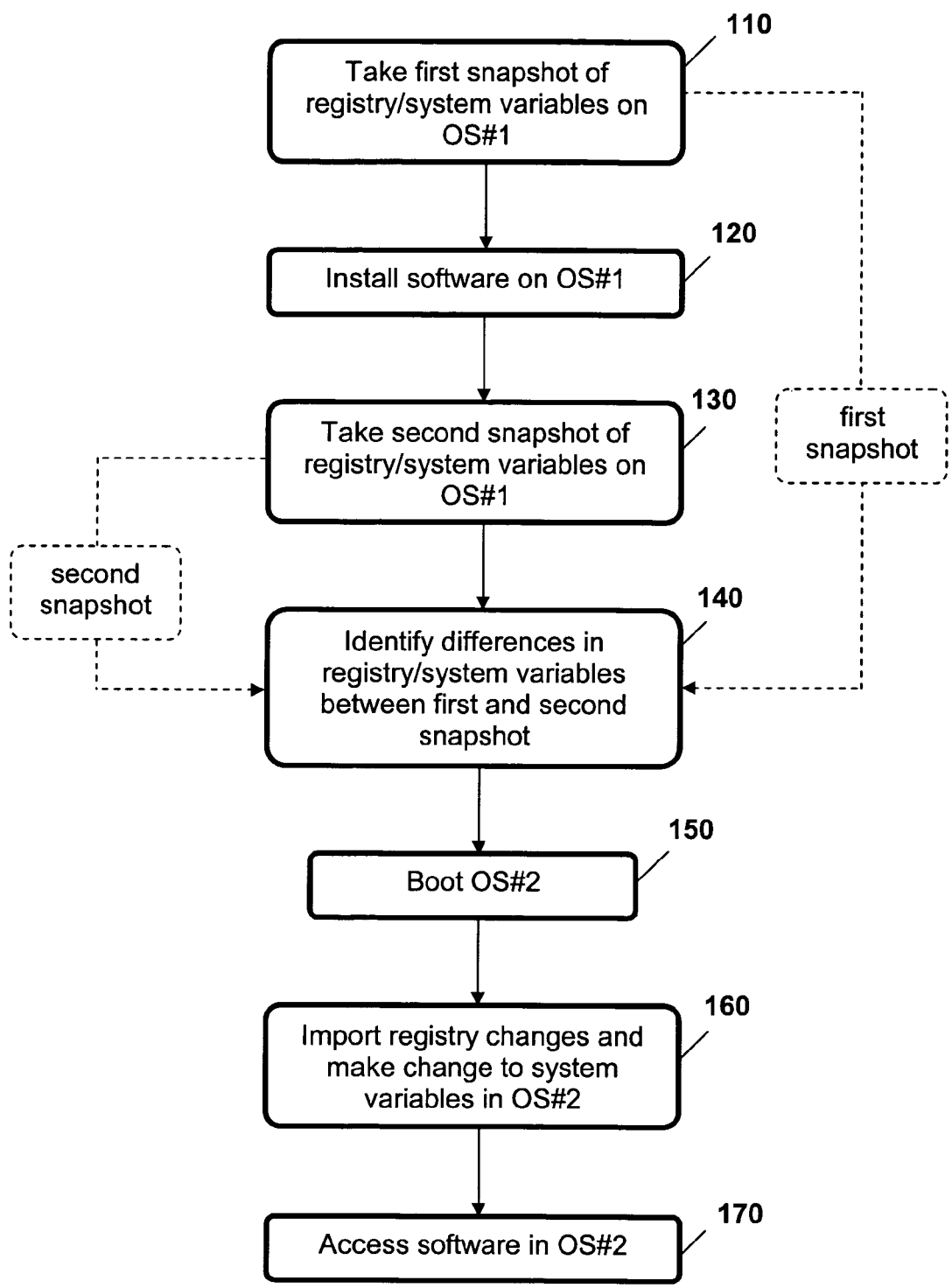
FIG. 1 is a flow chart of steps involved in sharing an application between two operating systems as described herein.

FIG. 1 is a flow chart that outlines the steps involved in this process, which are described below.

| | |
|---|---|
| Step 110 | A first snapshot of the system registry and system variables is taken in the first operating system. |
| Step 120 | The software application is installed on OS#1. |
| Step 130 | A second snapshot of the system registry and system variables is taken following the installation of the software application. |
| Step 140 | The differences between the two snapshots are identified. The second snapshot is compared with the first snapshot to detect the "changes"made by the software in the Registry. |
| Step 150 | The machine is booted in the second operating system (OS#2) (in which the software application is to be used). |

| | -continued |
|---|---|
| Step 160 | The changes in the Registry and system variables for software application are made in the registry and system variables of OS#2. |
| Step 170 | The software application can now operate in OS#2. |

Remote Installation

A user can install a software application on any one machine in a network and access the installation from other "compatible" machines. The term compatible is used in this context simply to denote an ability to execute a particular software application. Examples of compatible operation systems are different versions of an operating system, such as Windows 2000 and Windows XP Professional, which can be considered as compatible operating systems in this context. Similarly, different versions of AIX may be considered compatible operating systems.

Commercial software applications describe in their relevant documentation which operating systems are supported by the application. Installation instructions for a particular example software application may mention that the software application is supported on WindowsNT, Windows 2000, Windows XP, and perhaps others. These specified operating systems may be considered compatible operating systems.

A related aspect of compatibility is that the files stored on the first machine are readable from the second machine. For this, the storage format used by the operating system on the Machine 1 should be compatible to the storage format used by the operating system on Machine 2. To this end, one should be able to map the network drive of first machine on the second machine. As an example, all Microsoft Windows operating systems use File Allocation Table (FAT) file format, referred to as FAT 32.

A software developer can incorporate the techniques described herein into the software application that is to be shared across machines (or across operating systems on the sane machine) without requiring a conventional re-installation. The software developer provides this facility (as described herein) as a feature of the software application.

An installation option is provided for cases in which in the software application is already installed on a remote machine (or on another OS on the same machine). The OS of the remote machine is determined, and instead of copying the entire files relating to the software application, relevant changes are made as required to the registry/system variables/configuration files of the target machine. Such a procedure has advantages of relative speed and simplicity compared with a conventional installation procedure.

The software is first installed on a machine on a network. The software makes changes to the registry/configuration file and/or system variables depending on the type of OS present on the central/remote machine. This process represents a standard installation of the software application. The nature and extent of these changes vary depending on the type of operating system on which the software is installed. For example, if the software application is being installed on a Windows 2000 machine, then the changes that the software makes to the Registry differ from the changes that are made if instead the application is installed on a Windows 2003 machine.

The changes made to the Registry on the remote/central machine (as a result of installing the software application) are available as a .reg file. A client machine (that is, the Target Machine) on which the software application is to be installed from the remote/central machine maps or mounts the drive of the remote/central machine. Consequential changes made to system-wide variables such as the PATH Variable, SYSTEM variable on the remote/central machine are available on the client machine, and appropriate changes are mirrored on the client machine.

The client machine picks up the ".reg" file, makes the same changes to its registry as made on the remote/central machine by the installation of the software application, and is then able to begin using the software application from the remote/central machine. This technique can be used only if the remote machine and the local machine have the same version of the same operating system.

The software developer knows the registry changes (in case of Windows), configuration file changes (in case of other operating systems, such as Unix and its variants), and system variable changes that the software requires to function properly in each operating system. This information is stored in some format (such as a .reg file).

For remote install, the client machine (that is, the Target Machine which intends to use the installed software from the central machine) maps/mounts the drive of the central machine on which the software code is present.

The client machine starts the remote installation procedure of the software application, which is installed on the central machine.

The remote install feature of the software (present on the central machine) determines the operating system of the client machine. Changes are made to the registry/configuration file and system variables of the client machine. Note that the software code need not be copied to the client machine. Once these steps are taken, the client machine can now use the software.

When the client machine does not require the software, the client machine can invoke a remote uninstall procedure. This procedure removes the configuration changes made to the client machine during the remote installation process, based upon a record that is maintained of the changes made to system parameters during installation.

The user who invokes the remote installation feature needs administrator privileges, or to belong to a suitably privileged "Power Users" group in the client machine, in the case of a Windows operating system. For other operating systems, the user who invokes the remote installation from the client machine requires sufficient access rights to install a software application on the client machine. The user should also have execute permission and write permission on the central machine on which the software code is present.

When the remote uninstallation procedure is executed, the software application is uninstalled from the client machine only. The software application is not uninstalled from the central machine. If the application is to be uninstalled from the central machine, then the application is uninstalled in a conventional manner using a conventional uninstallation procedure.

The step-by-step procedure below is followed to access and execute a software application from a remote machine. A developer takes steps 1 to 4 while developing the software application, and an end-user takes steps 5 to 7 while installing the application.

1. The software developer determines a set of compatible operating systems from which the software being developed can be used.
2. The software developer identifies the changes that are made to the system parameters in each of these compatible operating systems.
3. The software developer creates an installation program, which identifies the target operating system on which the software is being installed, and based on the target operating system, makes the changes to the system parameters (registry, configuration files, and so on) on the target machine.
4. Two installation options are provided: a conventional install, which involves changing the system parameters and copying the software files on the client machine; and a remote install, which avoids copying of the source files.
5. The software is conventionally installed on the central machine.
6. The user maps the network drive of the central machine (on which the software is conventionally installed) to the client machine (on which the software is to be installed).
7. The user invokes the "remote install" procedure. The remote install procedure determines the operating system on the remote machine, and makes corresponding changes to the configuration of the client machine.

A user installing a software application in a conventional manner needs to specify only the location on the file system where the software application is to be installed. The installation program (for example, InstallShield of Macrovision Corporation) then copies the relevant "software-related" files to the computer's file system and makes the relevant "software-related" changes to the Registry and System Variables, as required.

Consider Machine M1 and Machine M2, which belong to the same network. Machine M1 uses a first operating system, OS#1 (for example, Microsoft's Windows 2000 operating system), and Machine M2 uses a second operating system, OS#2 (for example, Microsoft's Windows 2003 Server operating system).

A user installs a software application, for example, Microsoft Word, on Machine M1. The software application operates as expected when used from Machine M1. The user is, however, unable to use the same software application on Machine M2, which is typical in many small networks in which users share machines. She or he has no other option but to make a fresh installation of the desired software application on Machine M2. The user can thus use this installation option whenever software applications are to be shared between machines in a network without having to do a conventional installation on each of the machines. A user installs software "SW" on machine "M1" at the location "C\Program Files\SW" on the file system. The user wants "SW" to be usable from machine "M2" without having to do a full installation as for M1.

The user is prompted to select the machine on the network where the software is already installed and the location on the file system of that machine where the software is installed.

The user selects the Machine "M1" and the location "C\Program Files\SW" on the file system of M1 where Software "SW" is installed. This information is used to map/mount the drive of M1 to that of M2.

The remote installation procedure then finds the operating system on the remote machine (M1) and makes the corresponding changes to the configuration of the client machine (M2). This is accomplished by means of the following steps being followed by the software developer while coding the application.

The software developer determines the set of compatible operating systems from which the software being developed can be used. The software developer identifies the changes that the software needs to make to the configuration (registry, ini files etc.) in each of these operating systems.

The software developer creates an installation program. The installation program identifies the operating system on which the software is being installed, and based on the operating system, makes the changes to the registry, configuration files, and so on, on the operating system.

Multibooting Installation

This variation of the "Remote Installation: described above is applicable in a multibooting environment. Consider a software application (such as Microsoft Word) is installed on any one of the operating systems installed on a machine, and assume that two Windows operating systems (OS#1 and OS#2) are installed on that same machine. Software applications (such as Microsoft Word) installed under OS#1 are unable to be used from OS#2, and vice-versa. A user can thus use this option in a multibooting environment without actually needing to make a complete installation of the software on each individual OS in the multibooting environment.

A user boots in OS#1 and installs Software "SW" at the storage location "C\Program Files\SW" on the file system of the machine.

The user wants SW to be usable when she boots in OS#2 without having to do a full installation in the same manner as for OS#1.

The user selects an "Multibooting Installation" option.

The user is prompted to select the location on the file system where the software is installed (installed through any of the other operating systems present on the machine).

The user thus prompted selects the location "C\Program Files\SW" on the file system where SW' is installed, as above, in OS#1.

The installation program makes registry and system variable changes specific to SW on OS#2.

The installation program identifies the operating system on which the software is being installed (OS#2), and makes relevant changes to the registry, configuration files, as appropriate to the identified operating system.

The software developer determines the set of compatible operating systems from which the software application under development can be used. The software developer identifies the changes that are needed to be made to the configuration (registry, ini files, and so on) in each of these operating systems.

Registry/Configuration Changes

Changes to system parameters fall into two categories, described below as case (a) and case (b).

| | |
|---|---|
| Case (a) | The software specific registry changes required for each compatible OS are known to the Software Developer and are incorporated as part of the installation program. |
| Case (b) | The software specific registry changes required for each compatible OS are not known. |

The procedure for making the configuration changes are straightforward for case (a). In case (a), for the "Multibooting Installation" the following information is available to the installation program: (i) the OS of the machine on which the software is being installed, and (ii) the location on the file system where the software is installed through any of the other operating systems present on the machine. Using this information the installation program accordingly makes the registry/configuration changes specific to that OS on which the software is being installed (as is the case for conventional installation).

For case (a), for the "Remote Installation" option, the following information is available to the installation program: (i) the OS of the machine on which the software is being installed, and (ii) the machine on the network where the software is already installed, and the location on the file system of that machine where the software is to be installed. This information is used to map/mount the drive of M1 on which the software is installed onto M2.

Using this information the installation program accordingly makes the registry/configuration changes specific to that OS on which the software is being installed. While making these configuration/registry changes the installation program uses the mapped drive wherever required to point to the installed files specific to the software on the remote machine on which the software is already installed.

As an example, the installation program adds a registry entry as follows on machine M1 during the conventional installation.

TABLE 1

[HKEY_CLASSES_ROOT\Applications\
WINWORD.EXE\shell\edit\command]
@="\"D:\\Program Files\\Microsoft Office\\Office\\WINWORD.EXE\"

Machine M2 uses the "Remote Installation" procedure described above to install the software. As part of this installation procedure the user inputs the location on the file system on M1 where the software is installed. The drive "D" from M1 is accordingly mounted on M2, and is thus accessible as a mapped drive, say "Z".

The installation program therefore while making the registry changes specific to the software on M2 changes the above registry entry to refer to drive "Z" instead of "D" as presented in Table 2 below.

TABLE 2

[HKEY_CLASSES_ROOT\Applications\
WINWORD.EXE\shell\edit\command]
@="\"Z:\\Program Files\\Microsoft Office\\Office\\WINWORD.EXE\"

Consider case (b), in which the software specific registry changes required for each compatible OS are unknown, the following steps are performed. Case (b) applies in this case for software a software application which supports conventional installation, but is to be accessed for execution in a multibooting environment, or across machines in a network without requiring conventional installation environment or machine.

The example described directly below is for the option of "Multibooting Installation", in which OS#1 is Microsoft Windows 2000 Professional, and OS#2 is Microsoft Windows 2003 Server. The software application is for the purpose of installation of Microsoft Word. The procedural steps are as follows.
1. Backup the registry values on OS#1.
2. Take a snapshot of the System Variables, such as the PATH, on OS#1.
3. Install Microsoft Word on OS#1.
4. Take a further snapshot of the registry snapshot after installing MS Word
5. Detect of the differences between the registry snapshot taken in step 4 with the Registry Backup taken in step 2 to determined the changes made to the registry by installing Microsoft Word. The output from this step is a .reg file, which includes the Newly Added Registry entries and the modified registry entries by Microsoft Word.
6. Determine the changes if any done to the System Variables like the PATH by MS Word. Saved the changes to a text file.
7. Restart OS#1.
8. Boot in OS#2.
9. Import the .reg file, which is the output of step 5.
10. Make the changes to the System Variables, such as the PATH, on OS#2, taking into consideration the text file which is the output of step 6.

Detecting the differences between the two registry snapshots can be done by using any standard "text diff." tool. An example of such a diff tool is "CSDiff" of ComponentSoftware Inc., though any other suitable tool can also be used to determine newly added registry entries, and modified registry entries. The steps followed to detect the differences in the registry using CSDiff, and thereby finding out the software specfic registry values are as follows.

The steps involved in detecting differences are, in the case of CSDiff, as follows. The two "before" and "after".reg files generated in steps 2 and 4, as described above, are provided as input to CSDiff, which is set to show only differences. The output from CSDiff includes newly added registry entries, as well as modified registry entries. The modifications are shown as strikethrough text for the earlier content of the registry key plus the newly added content. The strikethrough text is replaced with blank text, so that this final output thus identifies newly added registry entries and modified registry entries.

Executing winword.exe from OS#2 from its installed path on the file system thus operates as expected. The same operation when done without first performing the following 10 steps above gives errors, and Microsoft Word cannot be launched. On OS#2 new files can be created and saved, and saved files can be opened and the application operates in the same manner as from OS#1.

The registry changes made by Microsoft Word include those made to HKEY_LOCAL_MACHINE and HKEY_USERS. Changes made to HKEY_LOCAL_MACHINE are only imported. Features like file associations, launching of Microsoft Word supported document formats in Microsoft Word, right-click menu options, entries in Programs folder, and so on can be activated by making the HKEY_USERS registry changes on the OS#2. While the HKEY_LOCAL_MACHINE changes can be made verbatim, the HKEY_USERS changes need to be done by replacing the user's SID from the added registry KEY on OS#1 with the appropriate SID of the user on OS#2.

For example, the registry entry on OS#1 is presented in Table 3 below.

TABLE 3

[HKEY_USERS\S-1-5-21-135449575-101265881-2389969595-
500\Software\Microsoft\Office\Word\Addins\WebPage.Connect]
"FriendlyName"="Web Page Wizard"
"LoadBehavior"=dword:00000008

This registry entry is replicated not in verbatim fashion, but is changed slightly when replicated on OS#2 to take the correct SID into account. Thus for an administrative user on OS#2 with SID=S-1-5-21-436374069-1580436667-839522115-500 the registry entry is adapted accordingly.

Computer Hardware

Figure 2:
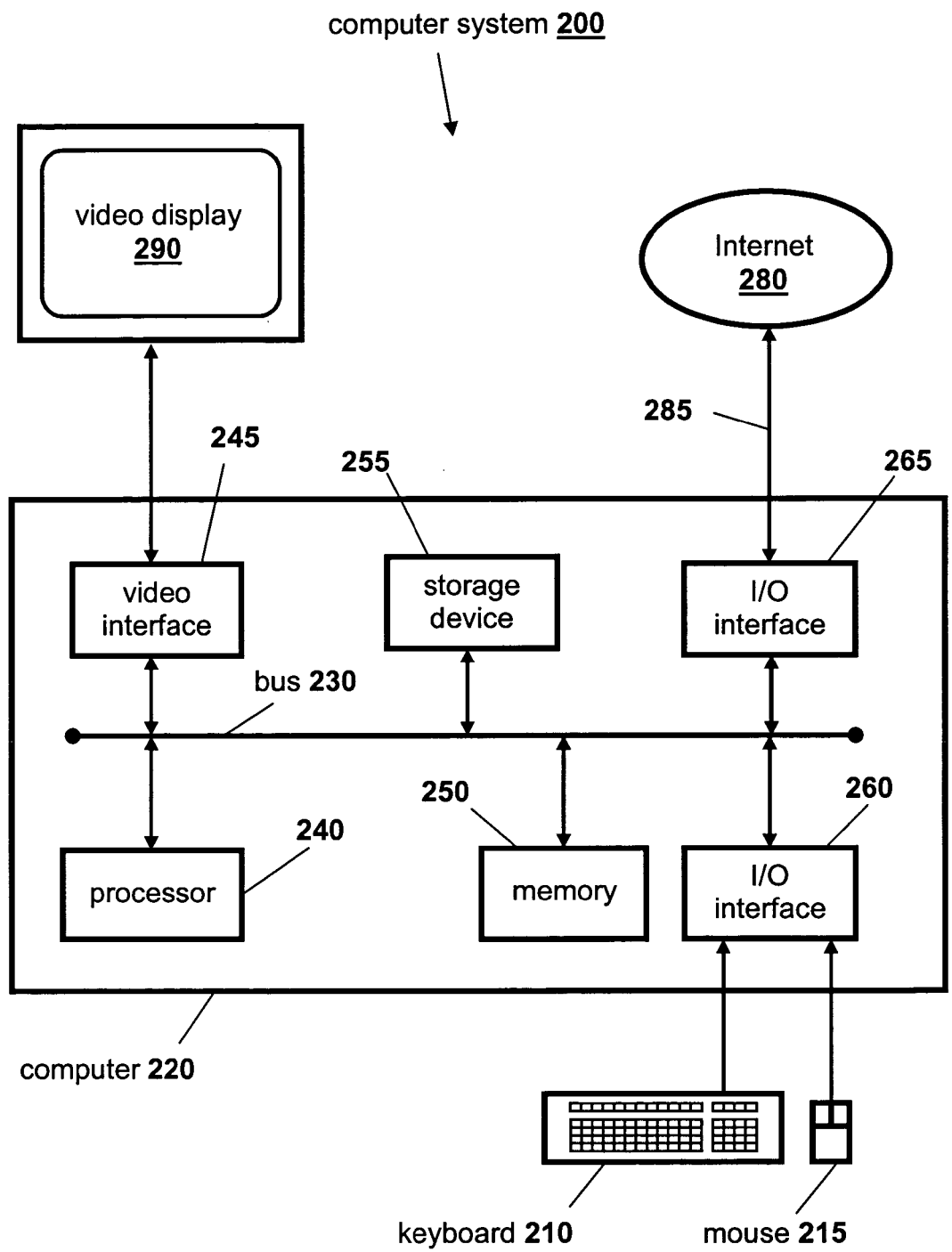
FIG. 2 is a schematic representation of a computer system suitable for performing the techniques described with reference to FIG. 1.

FIG. 2 is a schematic representation of a computer system 200 suitable for hosting multi-booting environments in which applications can be shared, as described herein. Computer software programs executes under a suitable operating system installed on the computer system 200, and may be thought of as a collection of software instructions for implementing particular steps.

The components of the computer system 200 include a computer 220, a keyboard 210 and mouse 215, and a video display 290. The computer 220 includes a processor 240, a memory 250, input/output (I/O) interfaces 260, 265, a video interface 245, and a storage device 255. All of these components are operatively coupled by a system bus 230 to allow particular components of the computer 220 to communicate with each other via the system bus 230.

The processor 240 is a central processing unit (CPU) that executes the operating system and the computer software program executing under the operating system. The memory 250 includes random access memory (RAM) and read-only memory (ROM), and is used under direction of the processor 240.

The video interface 245 is connected to video display 290 and provides video signals for display on the video display 290. User input to operate the computer 220 is provided from the keyboard 210 and mouse 215. The storage device 255 can include a disk drive or any other suitable storage medium.

The computer system 200 can be connected to one or more other similar computers via a input/output (I/O) interface 265 using a communication channel 285 to a network, represented as the Internet 280.

The computer software program may be recorded on a storage medium, such as the storage device 255. Alternatively, the computer software can be accessed directly from the Internet 280 by the computer 220. In either case, a user can interact with the computer system 200 using the keyboard 210 and mouse 215 to operate the computer software program executing on the computer 220. During operation, the software instructions of the computer software program are loaded to the memory 250 for execution by the processor 240.

Other configurations or types of computer systems can be equally well used to execute computer software that assists in implementing the techniques described herein.

CONCLUSION

Individual operating system installations consume considerable amount of disk space in a multi-boot environment (that is, multiple operating systems installed on the same machine). Disk space savings available using the techniques described herein can be substantial. The techniques described herein are especially suited to testing and development environments in which multi-booting environments are used for testing purposes. A single instance of a particular configuration of software under development could be maintained on a single machine, though shared by multiple developers or testers. Client machines (that is, target machines which use the installed software from a central machine) can install required software for short term use (that is, by importing registry changes, without the overhead of copying all software files) and "throw" (uninstall) these changes when finished. Software that is used only occasionally can be used in this manner.

Though Microsoft Windows is primarily described, the techniques described herein are also applicable to other operating systems. As an example, consider the UNIX-style AIX operating system of IBM Corporation. AIX has an Object Data Manager that is similar to the Windows registry. So, in case of AIX, changes to the Object Data Manager are correspondingly tracked. Software installed in AIX may also use configuration files, such as .ini files, .dat files. Some of these files may record information specific to the operating system on which the software is installed. Similar considerations apply for other UNIX-style operating systems.

Various alterations and modifications can be made to the techniques and arrangements described herein, as would be apparent to one skilled in the relevant art.

We claim:

1. A computer-implemented method for executing a software application on a different operating system than an operating system on which said software application is installed, said method comprising:
identifying, by a computing device, changes in system parameters in a first operating system made upon installing said software application in said first operating system;
changing, by said computing device, system parameters in a second operating system to be compatible with the first operating system based upon the changes in system parameters in the first operating system without installing said software application on said second operating system; and
accessing, by said computing device, the software application installed on said first operating system for execution in the second operating system,
said changed system parameters point to installed files specific to said software application on a mapped drive of said first operating system on which said software application is already installed.

2. The method as claimed in claim 1, further comprising storing, by said computing device, a first record of system parameters of the first operating system before installing the software application.

3. The method as claimed in claim 2, further comprising installing, by said computing device, said software application in the first operating system.

4. The method as claimed in claim 3, further comprising storing, by said computing device, a second record of system parameters of the first operating system subsequent to installing the software application.

5. The method as claimed in claim 4, wherein the changes in the system parameters are identified by comparing the first record and the second record.

6. The method as claimed in claim 1, wherein the first operating system and the second operating system are bootable from different computer systems.

7. The method as claimed in claim 6, further comprising mapping, by said computing device, a drive of a first machine which hosts the first operating system and the software application, onto the drive of a second machine from which the software application is to be accessed for execution.

8. The method as claimed in claim 1, wherein the first operating system and second operating system are bootable from one computer system.

9. The method as claimed in claim 1, wherein the first operating system and second operating system are different versions of the same operating system.

10. The method as claimed in claim 1, further comprising maintaining, by said computing device, a record of changes to the system parameters made in the second operating system.

11. The method as claimed in claim 10, further comprising reversing, by a computing device, recorded changes to the system parameters made in the second operating system.

12. A computer-implemented method for executing a software application on a different operating system than an operating system on which said software application is installed, said method comprising:
identifying, by a computing device, from a set of operating systems compatible with a first operating system, a second operating system from which the software application installed on the first operating system is to be executed; and changing, by said computing device, system parameters in the second operating system based upon changes in system parameters of the first operating system relating to installation of the software application on the first operating system without installing said software application on said second operating system;

wherein changes made to the system parameters in the second operating system allow the software application to be accessed in the first operating system for execution in the second operating system, said changed system parameters point to installed files specific to said software application on a mapped drive of said first operating system on which said software application is already installed.

13. The method as claimed in claim 12, further comprising storing, by said computing device, a first record of system parameters of the first operating system before installing the software application.

14. The method as claimed in claim 13, further comprising installing, by said computing device, said software application in the first operating system.

15. The method as claimed in claim 14, further comprising storing, by said computing device, a second record of system parameters of the first operating system subsequent to installing the software application.

16. The method as claimed in claim 15, wherein the changes in the system parameters are identified by comparing the first record and the second record.

17. The method as claimed in claim 12, wherein the first operating system and the second operating system are bootable from different computer systems.

18. The method as claimed in claim 17, further comprising mapping, by said computing device, a drive of a first machine which hosts the first operating system and the software application, onto the drive of a second machine from which the software application is to be accessed for execution.

19. A computer program product comprising:
a storage medium tangibly embodying a program of instructions readable by a computer system and executable by said computer system for implementing a method of:

identifying from a set of operating systems compatible with a first operating system, a second operating system from which a software application installed on the first operating system is to be executed; and changing system parameters in the second operating system based upon changes in system parameters of the first operating system relating to installation of the software application on the first operating system without installing said software application on said second operating system;

wherein changes made to the system parameters in the second operating system allow the software application to be accessed in the first operating system for execution in the second operating system, said changed system parameters point to installed files specific to said software application on a mapped drive of said first operating system on which said software application is already installed.

20. A computer system comprising:
a processor for executing software instructions;
a memory for storing software instructions;
a system bus coupling the memory and the processor; and
a storage medium recording software instructions that are loadable to the memory for implementing a method of:

identifying from a set of operating systems compatible with a first operating system, a second operating system from which a software application installed on the first operating system is to be executed; and changing system parameters in the second operating system based upon changes in system parameters of the first operating system relating to installation of the software application on the first operating system without installing said software application on said second operating system;

wherein changes made to the system parameters in the second operating system allow the software application to be accessed in the first operating system for execution in the second operating system, said changed system parameters point to installed files specific to said software application on a mapped drive of said first operating system on which said software application is already installed.

* * * * *